United States Patent Office 3,249,511
Patented May 3, 1966

3,249,511
PROCESS FOR PRODUCING GUANOSINE-5'-MONOPHOSPHATE BY FERMENTATION
Shinji Okumura, Kanagawa-ken, Japan (8–22 3-chome, Jiyugaoka, Meguro-ku, Tokyo, Japan); Teruo Yamanoi, 120 1-chome, Narimune, Suginami-ku, Tokyo, Japan; Kazuo Komagata, 2 Kakoi-cho, Nakano-ku, Tokyo, Japan; Teruo Shiro, 4741 Kowada, Chigasaki-shi, Kanagawa-ken, Japan; Nobutoshi Muramatsu, 84 Shirohata-minami-cho, Kanagawa-ku, Yokohama-shi, Kanagawa-ken, Japan; Ryohei Aoki, 100–1 Nakanodate, Akamatsu-cho, Saga-shi, Saga-ken, Japan; Toshinao Tsunoda, 331 Zushi, Zushi-shi, Kanagawa-ken, Japan; Masahiro Takahashi, 327 Dosaka-machi, Bunkyo-ku, Tokyo, Japan; and Shinichi Motozaki, Mie-ken, Japan (201 3-chome, Tamagawa-Okusawa-cho, Setagaya-ku, Tokyo, Japan)
No Drawing. Filed Apr. 14, 1965, Ser. No. 447,985
Claims priority, application Japan, Mar. 1, 1961, 36/6,732
4 Claims. (Cl. 195—28)

This application is a continuation-in-part of application Serial No. 192,985 filed on May 7, 1962, and now abandoned.

This invention relates to fermentative processes for the production of guanosine-5'-monophosphate.

We have found that when *Brevibacterium helvolum* ATCC 11822 or Brevibacterium sp. No. 450 ATCC 14604 is cultured in a medium containing saccaridic, nitrogenous, phosphorous and inorganic materials with growth factors under aerobic conditions while the pH is maintained at neutral or on the alkaline side, guanosine-5'-monophosphate is produced and accumulated outside the whole cells.

The bacteria capable of producing 5'-GMP are obtained from the American Type Culture Collections.

A medium useful for this process is preferably prepared for the purpose of increasing the production and the accumulation of 5'-GMP. The important components of the culture medium are as follows:

(1) *Carbon source.*—Any substance which can be utilized as a carbon source by the bacteria of this invention may be used alone or in admixture. For instance, glucose, starch hydrolyzate, sucrose, molasses, etc. are useful.

The carbon source has the function of forming the constituents of vegetative cells of bacteria, to produce energy for growth and fermentation, and to be converted into ribose and guanine.

(2) *Phosphorus source.*—The phosphorus source is very inmportant for this process, since it is required for bacterial growth and is also introduced into the phosphorus components of 5'-GMP. In this process, any inorganic or organic phosphorus compound which can be utilized by said bacteria is converted to the phosphate radical of 5'-GMP. Among various phosphorus containing compounds, the mono- to tri-potassium phosphate and mono- to tri-sodium phosphate are most excellent phosphorus sources. These inorganic compounds are required in the amount of 0.5% or more.

(3) *Nitrogen source.*—As the nitrogen source, inorganic and organic ammonium salts, urea, nitrate, and ammonia, etc. may be utilized.

(4) *Inorganic salts.*—For the bacterial growth, $Mn^{++}$, $Fe^{++}$, $Mg^{++}$, $K^+$, $Na^+$, $SO_4^{--}$, $Cl^-$, etc., should be added to the culture medium.

(5) *Nutrition of bacteria.*—In order to produce and accumulate large amounts of 5'-GMP, it is necessary that specific nutrient circumstances be maintained to make the bacteria active in fermentation. The term "nutrient" described above does not mean carbon source or nitrogen source.

The addition of L-glutamic acid, L-aspartic acid and/or glycine, as well as the other amino acids, to the culture medium is effective for the accumulation of 5'-GMP under suitable nutritive circumstances.

The said nutrient contains a small amount of dry yeast, yeast extract, meat extract, animal tissue extract, malt extract, animal or plant protein hydrolyzate, corn steep liquor, vitamins, and fatty acids, etc. They may be used alone or in admixture.

In the present invention, pH control of the culture medium during fermentation is very important, because a high concentration of 5'-GMP is obtained at pH values of about 6 to 9. The pH controlling reagent such as ammonia, urea, $CaCO_3$, $BaCO_3$, $Ca(OH)_2$, $Ba(OH)_2$, NaOH and KOH are used when the culture medium is on the acidic side, and HCl, acetic acid, formic acid, and sulfuric acid are used when on the alkaline side. $CaCO_3$ which is sterilized separately is generally added to a medium in an amount of 2% by weight.

Even though the bacteria are cultured in a suitable medium, 5'-GMP is produced in small yield, unless a large quantity of oxygen is supplied to the culture medium. For example, when the culture medium is placed in a flask and stationary culture is effected, the characteristic appearance of growth is observed, but the amount of 5'-GMP accumulated is negligible.

The culturing proceeds at a temperature between about 25° C. to 35° C., and the fermentation process is continued for about 40 to 96 hours.

Several known methods are adapted for being applied to separate the 5'-GMP accumulated in a culture liquor. For instance, W. E. Cohn's method (Science, 109, 377 (1949), J. Am. Chem. Soc., 72, 1471 (1950)) is available.

*Example 1*

A culture medium containing 5 g./dl. of glucose, 0.5 g./dl. of $KH_2PO_4$, 0.04 g./dl. of $MgSO_4 \cdot 7H_2O$, 2 p.p.m. of ferrous and manganese ion, 0.6 g./dl. of urea, 0.2 g./dl. of sodium nitrate, 0.1 g./dl. of L-glutamic acid, 0.1 g./dl. of L-aspartic acid, 0.1 g./dl. of glycine, 0.05 g./dl. of casamino acid (Difco), 0.05 ml./dl. of corn steep liquor and 0.05 g./dl. of yeast extract was prepared, and the pH of the medium was adjusted to 7.0. 20 ml. of the medium was poured into a 500 ml. flask, sterilized at 115° C., and separately sterilized $CaCO_3$ was added to the medium in an amount of 2%.

*Brevibacterium helvolum* ATCC 11822 was inoculated into the medium, and cultured at 31° C. for 90 hours with shaking. The pH of the culture medium was maintained between about 6 to 9 during the incubation.

One liter of the cultured broth contained 400 mg. of 5'-GMP. Bacterial cells were removed from one liter of the cultured broth, a pH of the clear solution was adjusted to 9.0 with ammonia, and passed through a column packed with a Dowex-1 (formate form). 5'-GMP adsorbed on the resin was eluted with formic acid-sodium formate buffer solution, lyophiled, and then 90 mg. of crude crystalline 5'-GMP was obtained.

*Example 2*

A culture medium containing 5 g./dl. of glucose, 0.5 g./dl. of $KH_2PO_4$, 0.04 g./dl. of $MgSO_4 \cdot 7H_2O$, 2 p.p.m. of ferrous and manganese ion, 0.6 g./dl. of urea, 0.2 g./dl. of sodium nitrate, 0.1 g./dl. of L-glutamic acid, 0.1 g./dl. of L-aspartic acid and 0.1 g./dl. of glycine was prepared, and the pH of the medium was adjusted to 7.0.

Brevibacterium sp. No. 450 (ATCC No. 14604) was incubated in the medium and cultured in the same procedure as that in Example 1.

The cultured broth contained 30 mg./dl. of 5'-GMP, and 70 mg. of crude crystalline 5'-GMP was obtained from one liter of the broth.

What we claim is:
1. A process for producing guanosine-5'-mono-phosphate by bacterial fermentation which comprises cultivating a strain of bacteria selected from the group consisting of *Brevibacterium helvolum* ATCC No. 11822 and *Brevibacterium* sp. No. 450 ATCC 14604 in a culture medium containing an assimilable carbon source, an assimilable nitrogen source, phosphorous compound, an inorganic salt, and an organic nutrient under aerobic conditions at a pH within the range of 6 to 9, accumulating the produced guanosine-5'-monophosphate directly in the medium and thereafter separating the thus produced and accumulated guanosine-5'-monophosphate from the culture medium.

2. A process as claimed in claim 1, wherein the culture medium is shaken.

3. A process as claimed in claim 1, wherein the cultivating is effected for 40 to 96 hours.

4. A process as claimed in claim 1, wherein the cultivating is effected at a temperature between about 25° C. and 35° C.

References Cited by the Examiner
UNITED STATES PATENTS 3,139,385   6/1964   Ogata et al. _____ 195—28

OTHER REFERENCES

American Type Culture Collection Catalogue of Cultures, 6th ed., 1958, page 15.

Biochemica et Biophysica acta., vol. 37, pages 380 to 382 and 398 to 405 (1960).

Chem. Pharm. Bull. Japan, Okabayashi et al., vol. 8, pages 370 to 372 (1960).

A. LOUIS MONACELL, *Primary Examiner.*

ALVIN E. TANENHOLTZ, *Examiner.*